G. NORTH.
ALTERNATING CURRENT ELECTRIC METER.
APPLICATION FILED JUNE 21, 1911.

1,116,472.

Patented Nov. 10, 1914.

WITNESSES:
C. L. Belcher
B. B. Hines

INVENTOR
Gilbert North
BY
Shelly G. Carr
ATTORNEY

UNITED STATES PATENT OFFICE.

GILBERT NORTH, OF STRETFORD, ENGLAND, ASSIGNOR TO WESTINGHOUSE ELECTRIC AND MANUFACTURING COMPANY, A CORPORATION OF PENNSYLVANIA.

ALTERNATING-CURRENT ELECTRIC METER.

1,116,472.   Specification of Letters Patent.   Patented Nov. 10, 1914.

Application filed June 21, 1911. Serial No. 634,584.

*To all whom it may concern:*

Be it known that I, GILBERT NORTH, a subject of the King of Great Britain, and a resident of Stretford, in the county of Lancaster, England, have invented a new and useful Improvement in Alternating-Current Electric Meters, of which the following is a specification.

This invention relates to alternating current electric meters and in particular to instruments of this class, known as induction type meters, in which the magnetic flux due to coils connected in series with and in shunt to the circuit, the energy supplied to which is required to be measured, act upon an armature shaped to a figure of revolution usually a circular disk.

The object of the invention is to construct an efficient meter of this type having good working characteristics which shall be simple and cheap to manufacture, of very small dimensions and light weight.

The improved meter of the present invention in common with other well-known meters of the class above mentioned, is provided with two iron circuits for the magnetic flux due to the shunt coil, one of these circuits being arranged so that the flux therein passes through the meter disk or armature and the other, generally known as the leakage path, being provided with a suitable air gap or gaps, the flux in this path not passing through the meter disk. The series coil or coils are also provided with iron circuits and substantially the whole of the flux due to the series winding passes through the meter disk. In order to reduce the dimensions of the meter as far as possible, it is necessary to reduce the reluctance of the leakage path for the shunt flux, but to maintain a large driving torque the reluctance of the path for that portion of the shunt flux which passes through the meter armature must also be reduced. At the same time in order to obtain a satisfactory load curve the reluctance of the path for the series flux should be high, so as to reduce the damping effect of the series poles on the disk.

According to the present invention the reluctance of the path of the shunt flux at the point where it traverses the movable member of the instrument is arranged to be decreased without correspondingly decreasing the reluctance of the path of the series flux.

The invention is illustrated in the accompanying drawings, of which—

Figures 1 to 6 inclusive are diagrammatic views illustrating various constructional forms of the cores and windings of meters embodying the invention.

Figure 1:
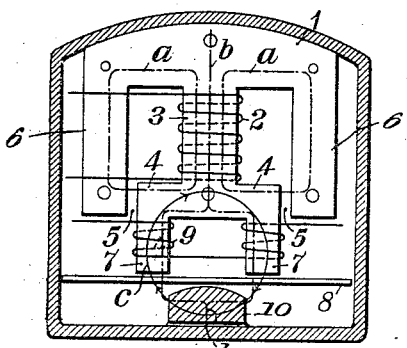

Referring now to Fig. 1 the shunt core of the meter is indicated at 1 and is substantially E-shaped in form, the shunt coil 2 of the meter surrounding the central limb 3 of the core which is provided with lateral projections 4, the ends of which are separated by small air gaps 5 from the outer limbs 6. Two extensions 7 projecting from the portions 4 and adjacent to the meter disk 8 constitute the series core of the instrument, the series coils 9 being wound in opposite directions around the projections 7. The paths of the fluxes due to the series coils 9 and the shunt coil 2 also include a convex projection 10 of magnetizable material situated below the meter disk 8 and attached to the meter case or frame. The paths of the fluxes due to the shunt coil 2 are indicated in the figure by the dotted lines $a$, $b$, and the path of the flux due to the series coils 9 by the full line $c$, it being understood that the magnetic circuit of the flux traversing the path $b$ is completed through the casing or frame of the meter. As will be observed the arrangement of the parts of the core of the shunt and series windings 2 and 9 is such that while the path $a$, traversed by the leakage flux due to the shunt coil, has a low magnetic reluctance, the part of the flux passing through the meter disk 8 along the path $b$ traverses the portions 7 and 10 of the core and the two air gaps between these portions in parallel with one another so that the reluctance of the magnetic circuit of this flux is also relatively low and a powerful driving torque due to the shunt flux is thereby obtained. The path of the series flux, on the other hand, includes the portions 7 of the core and the air gaps between these portions and the projection 10 in series with one another and the reluctance of the magnetic circuit of this flux is therefore relatively high so that the damping effect of the series poles is reduced and a satisfactory load curve for the meter is thereby obtained.

Figure 2:
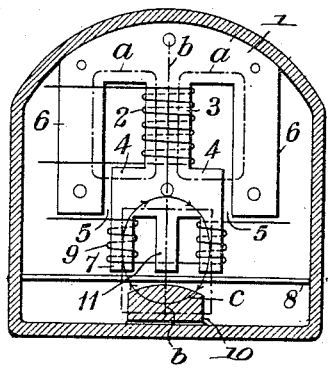

Referring now to Fig. 2 a modification of the arrangement above described is illustrated in which the reluctance of the circuit of that portion of the shunt flux traversing the disk 8 of the meter is further reduced by the provision of an additional projection 11 attached to the central limb 2 of the shunt core 1 opposite to the projection 10. The provision of the projection 11 evidently provides a third path for the shunt flux passing through the meter disk in addition to the paths provided by the projections 7, the path of the series flux remaining unaltered.

Figure 3:
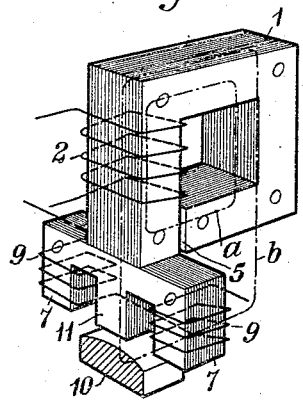
Figure 4:
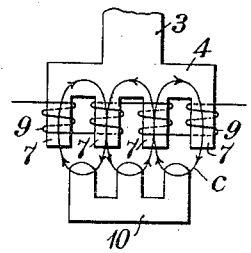

Fig. 3 illustrates a modification of the arrangement of Fig. 2 in which the core 1 is of such shape that the leakage flux traverses a single path $a$ the plane of which is at right angles to the plane of the path $c$ of the series flux.

The number of poles through which the main shunt magnetic flux passes is not limited to three, and the series coil may be wound on all or some only of said poles. For example, in the construction shown in Fig. 4, four projections 7 upon which the series coils 9 of the motor are wound are provided, the projection 10 having three limbs located opposite to the spaces between each of the projections 7.

In the above modifications the poles or the said iron part may be rounded on that side facing the series poles if necessary in order to properly proportion the size of the air gap for the series flux.

Figure 5:
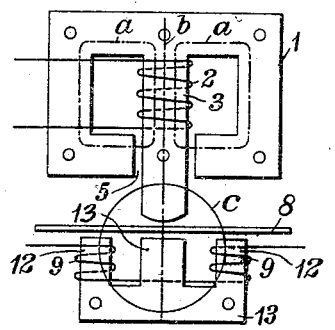

Referring now to Fig. 5 a further constructional form of the invention is illustrated in which the series coils 9 of the meter are wound upon the outer limbs 11 of a separate E-shaped core 12, the central limb 13 of which serves to decrease the reluctance of the path $b$ of the shunt flux of the meter in a similar manner to the projection 10 of the construction shown in the figure. The path $c$ of the series flux in this case includes the air gaps between the central limb 3 of the shunt core 1 and the outer limbs of the core 12 in series with one another and is therefore relatively high.

Figure 6:
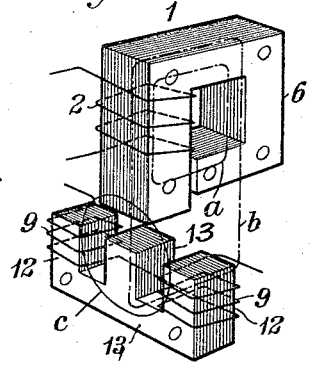

Referring now to Fig. 6 a modification of the arrangement of Fig. 5 is illustrated in which the shape of the shunt core 1 is such that the leakage flux follows a path $a$ similar to that of the leakage flux in the construction shown in Fig. 3.

It will be observed that in all the constructions according to invention, the iron case or supporting frame of the meter forms a portion of the path for the main magnetic flux due to the shunt winding, but the reluctance of said path is reduced as much as possible. To assist in reducing the reluctance the total section of the poles through which the shunt magnetic flux passes into the meter disk is made as large as possible compared with the section of the part on which the shunt coil is wound. Thus the latter section need be no greater than is necessary to avoid saturation of the iron, and the shunt coil will be of correspondingly small dimensions.

I claim as my invention:

1. An alternating current motor-meter comprising a voltage winding, a magnetizable core having a leg surrounded by the voltage winding and a part that extends adjacent to, but is separated by a small air gap from, the side of the said leg, the said leg being provided with a multi-polar extension that projects beyond the said lateral core part, a load winding surrounding certain of the poles of said extension while another of the poles constitutes a pole for the voltage winding.

2. An alternating current motor-meter comprising a voltage winding, a magnetizable core having a leg surrounded by the voltage winding and a part that extends adjacent to, but is separated by a small air gap from, the side of the said leg, the said leg being provided with a multi-polar extension that projects beyond the said lateral core part and extends transversely with respect thereto, a load winding surrounding certain of the poles of said extension while another of the poles constitutes a pole for the voltage winding.

In testimony whereof, I have hereunto subscribed my name this eighth day of June, 1911.

GILBERT NORTH.

Witnesses:
LEOPOLD CHARLES BENTON.
EDWIN EDGAR.